United States Patent [19]

DeJohn

[11] Patent Number: 5,275,451

[45] Date of Patent: Jan. 4, 1994

[54] MATERIAL HANDLING APPARATUS FOR TRANSPORTING LAY-OUT PATTERNS

[75] Inventor: Robert G. DeJohn, Indianapolis, Ind.

[73] Assignee: GenCorp Inc., Fairlawn, Ohio

[21] Appl. No.: 800,184

[22] Filed: Nov. 27, 1991

[51] Int. Cl.$^5$ .............................................. B29D 9/00
[52] U.S. Cl. ........................... 294/81.6; 294/61; 294/87.1; 271/18.3
[58] Field of Search ............ 294/81.2, 81.6, 87.1, 294/86.4, 121, 61, 88; 271/18.3

[56] References Cited

U.S. PATENT DOCUMENTS

| | | | |
|---|---|---|---|
| 1,691,552 | 11/1928 | Newman | 294/81.6 X |
| 2,233,929 | 3/1941 | Wehr | 294/81.6 |
| 3,610,673 | 10/1971 | Strombeck et al. | 294/81.6 X |
| 4,015,872 | 4/1977 | Loznak et al. | |
| 4,124,242 | 11/1978 | Canner | 294/61 |
| 4,444,423 | 4/1984 | Montferme et al. | 294/87.1 |
| 4,583,900 | 4/1986 | Cooley | |
| 4,805,949 | 2/1989 | Conway | |
| 4,946,551 | 8/1990 | Ishige et al. | |

Primary Examiner—Joseph D. Pape

[57] ABSTRACT

A material handling apparatus particularly suitable for transferring lay-out patterns to a molding die press comprises a central drive unit, a plurality of outstretched wing units operatively connected to the central drive unit, and a plurality of gripping talons supported by the wing units wherein the gripping talons are operative in unison by interconnection with the wing unit and central drive unit.

20 Claims, 5 Drawing Sheets

MATERIAL HANDLING APPARATUS FOR TRANSPORTING LAY-OUT PATTERNS

FIELD OF INVENTION

The present invention relates to a material handling apparatus and more specifically to an apparatus for lifting and transporting resin-impregnated, fiberglass lay-out patterns from a lay-out area to a molding die, such as a compression mold, for molding into fiberglass-reinforced plastic parts.

BACKGROUND

Reinforced, molded, plastic parts, particularly fiberglass-reinforced plastics, are produced from resin-impregnated fiberglass composites which approximate the configuration of the intended molded plastic part. A fiberglass preform is often used when the intended molded part design is complex, including deep draws and/or contouring. By the term "preform," it is generally meant a fiber-reinforced mat or layer which, in association with other layers, is applied to a mold and subsequently shaped and cured. Unsaturated polyester molding resins are the most commonly used thermosetting resins, although epoxy, phenolic, and silicone molding resins can be used to obtain special properties. The most common reinforcements are fibers, particularly fiberglass fibers, although carbon and synthetic fibers can be used, as well as glass fibers and other micro configurations. Sheet molding compounds can be advantageously used in closed die molding operations and ordinarily comprise preformed composites of randomly oriented glass fiber, thermosetting resin, fillers, initiators, catalysts, thickening agents, and the like. Sheet molding compounds can be up to about one-quarter inch thick and are particularly useful for compression molding. Compression molding for complete parts, however, has the disadvantage that several pieces or strips of sheet molding compound or other preformed resin impregnated fiberglass patterns must be transported by hand and individually located in various cavities within the die, a tedious and time-consuming preparatory step. Resin-impregnated fiberglass composites are typically unsupported and readily susceptible to damage upon handling in addition to having tacky surfaces. Manual arrangement of composites within the mold cavity is time-consuming and difficult. Technological molding problems are encountered due to the first applied resin-impregnated strip being subjected to heat for a longer period of time than the last applied strip and thus premature cure can occur. Cure inhibitors are generally added to prevent premature reaction, but extend the cure time and hence extend the molding cycle.

The various problems associated with molding complex thermoset molded fiberglass parts have prompted various proposed means for transferring uncured lay-out or patterns to molding dies. Lay-out stations are provided adjacent to the molding presses where resin-impregnated configurations are laid out in the same form or pattern as will be arranged in the press.

An impaling transfer apparatus is disclosed in U.S. Pat. No. 4,015,872, where the apparatus includes spearhead elements adapted to penetrate resinous composites to a molding press. The spearheads are rotated axially after penetration of the composite to engage the material for lifting and transportation. Upon reaching the molding die, the spearheads are aligned with stripper plates and reverse rotated and, in conjunction with the stripper plates, the preformed lay-out is discharged into the mold.

SUMMARY OF THE INVENTION

According to the present invention, the gripper apparatus comprises a central driver operatively interconnected with a plurality of outstretched wing units which in turn operatively actuate a plurality of griping talons in unison to pick up, transport, and discharge prearranged lay-outs or patterns. The central driver unit includes reciprocating drive means operatively engaging transmission means on each wing unit whereby each transmission means reciprocates simultaneously in response to the reciprocating drive means. Each transmission means simultaneously activates a plurality of gripper talons particularly located to effectively pick-up the lay-outs or pattern as a whole, that is, as a unit. Each gripper talon comprises a depending corkscrew talon adapted to penetrate the layout or pattern through a single hole. Each gripper talon is operative to rotate axially while simultaneously advancing or retracting in response to the reciprocating transmitted drive. The gripper apparatus of this invention is particularly useful in conjunction with a compression molding process wherein the gripping apparatus is particularly adapted to pick up complex prearranged patterns or lay-outs and properly locate the same within a compression molding die for molding the same into a thermoset, fiberglass-reinforced, plastic part.

The gripping apparatus can easily be assembled in a wide variety of configurations based on placement of the wing units as well as the gripper talon units, and thus provides great flexibility in application. Despite a multitude of possible configurations, the gripper talons are simultaneously actuated by a single driving mechanism resulting in accurate synchronization of all gripping talons upon releasing the layout preform into the mold. Moreover, the gripping apparatus can be robot-operated enabling operators to locate some distance from the molding press. The time required in each molding cycle to locate a complex pattern lay-out in the mold cavity is reduced considerably. Premature cure due to sequential placement of separate strips into a hot mold are avoided, cure inhibitors can be reduced, and the compression molding time can be reduced considerably. These and other advantages of the present invention will become more apparent by referring to the drawings and detailed description of the invention.

DETAILED DESCRIPTION OF THE INVENTION

Figure 1:
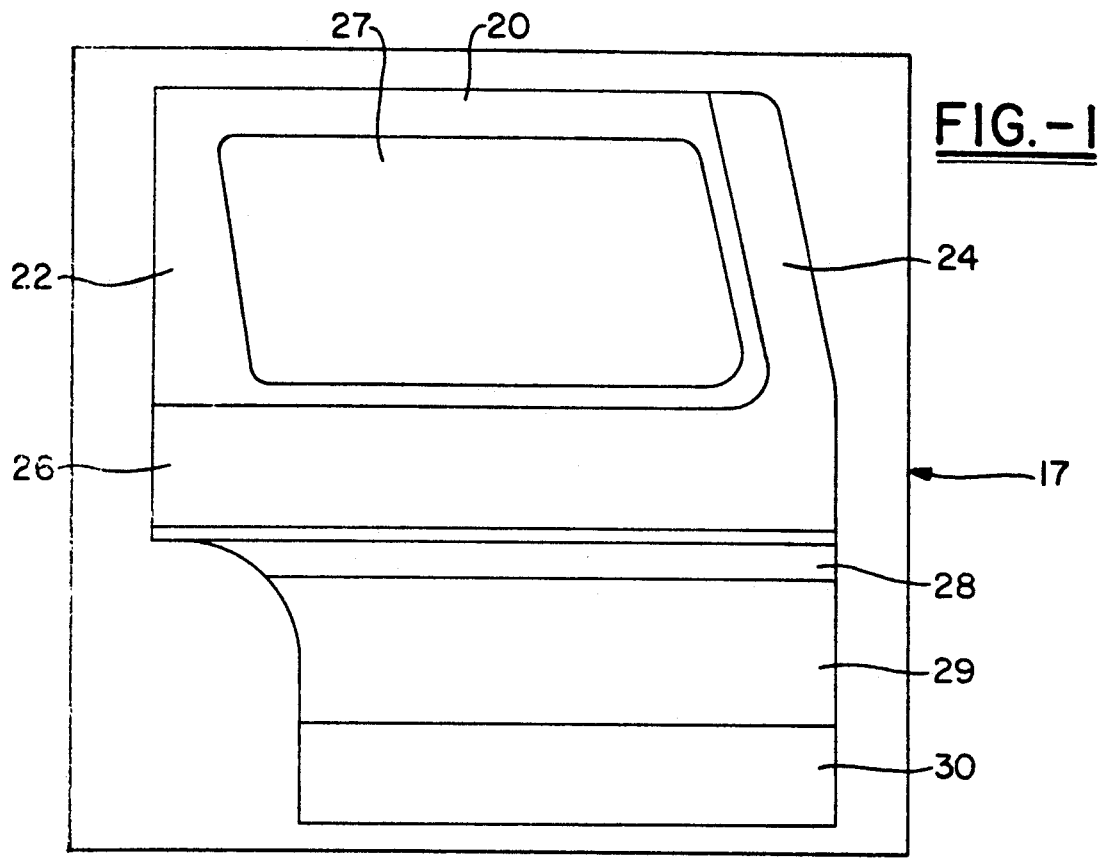
FIG. 1 is a top plan view of a die mold cavity for molding an automobile door containing a window opening.

Referring now to the drawings wherein like reference numerals designate like parts, shown is a gripping apparatus 15 operative to transfer a prearranged lay-out or pattern to a mold cavity for molding into a rigid, reinforced plastic part.

FIG. 1 represents a complex mold cavity 17 for an automobile side door containing a window wherein the mold cavity comprises sectional cavities representing an upper lateral door frame 20, area side frame 22, a front side frame 24, and a lower lateral frame 26, which together define an interior window 27. The automotive door die cavity 17 further contains laterally disposed bottom panels 28, 29, and 30.

Figure 2:
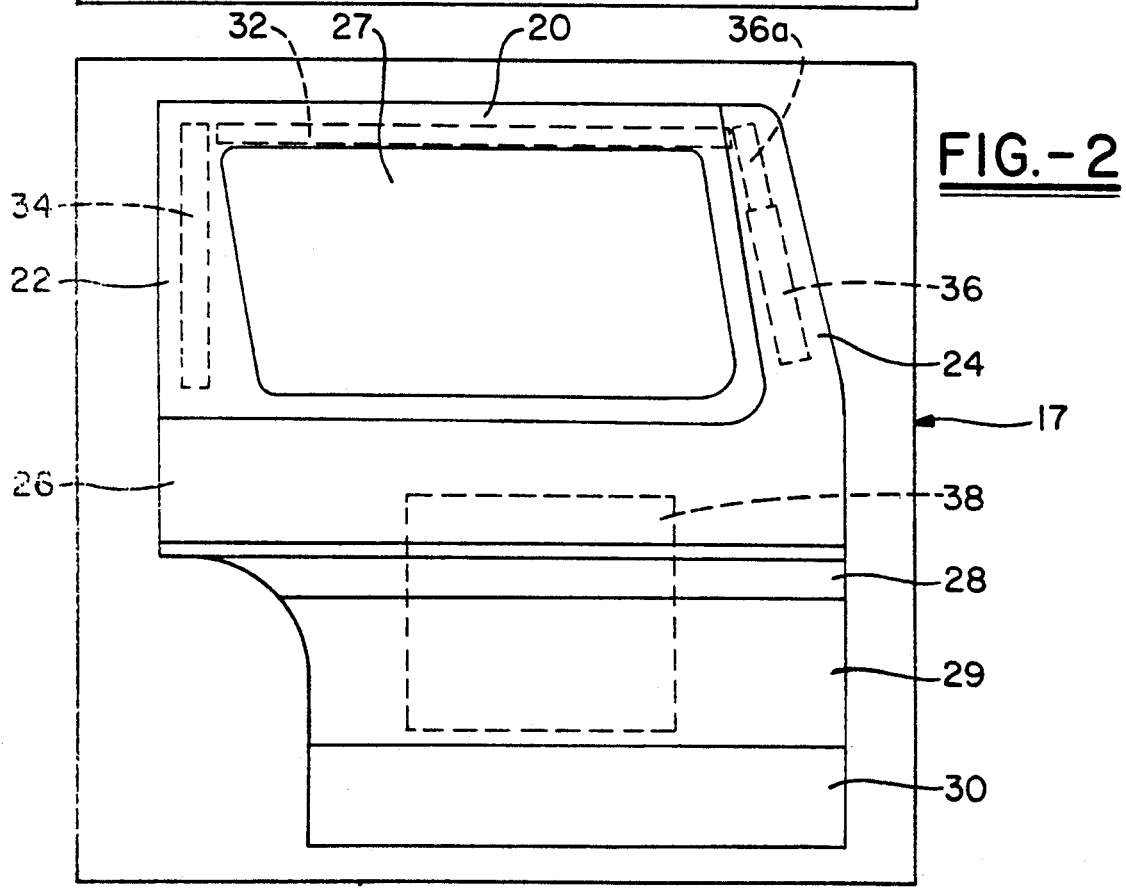
FIG. 2 is a top plan view of the die mold cavity shown in FIG. 1 with resin-impregnated molding strips shown in broken lines and located within the mold cavity.

In FIG. 2, the die cavity 17 contains a plurality of resin-impregnated glass fiber strips or sheets 32, 34, 36, 36a, and 38, shown in broken lines, preferably one or more layers of a sheet molding compound, which are particularly arranged within the mold die cavity 17 in preparation for compression molding into an automobile door. Each resin-impregnated strip is undersize of the cavity 17 dimension, but has sufficient thickness to compress and flow out to fill the die cavity 17 under heat and considerable pressure.

Figure 3:
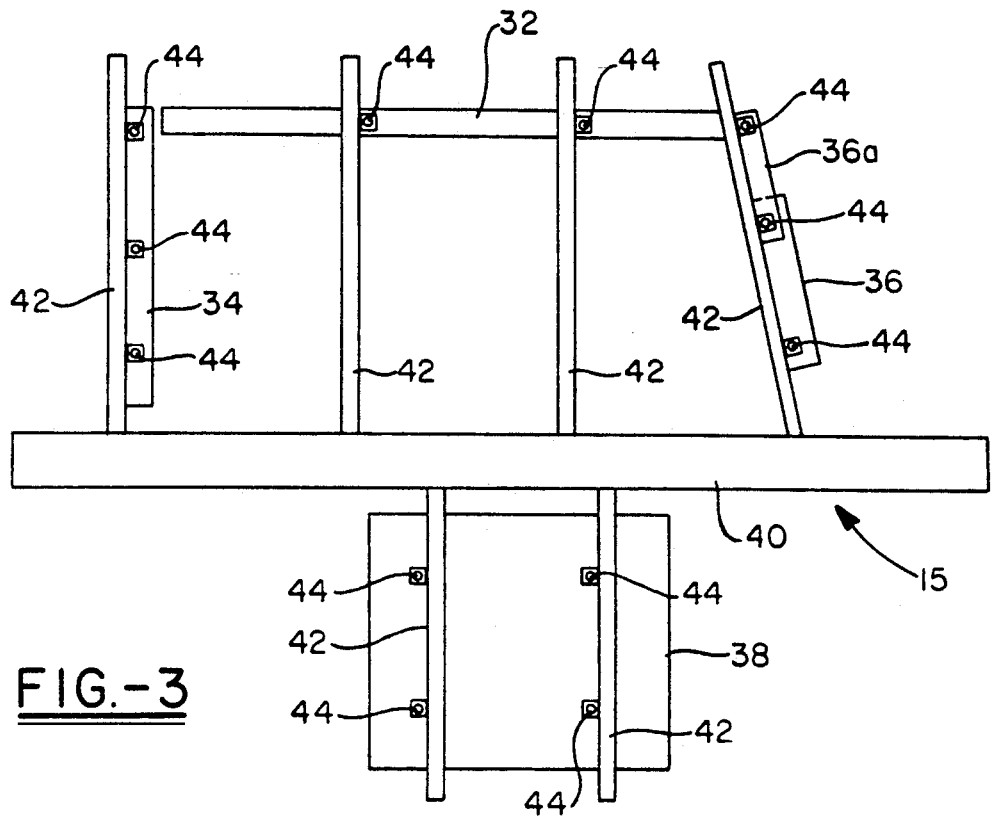
FIG. 3 is a top plan view of the gripper apparatus of this invention at a lay-out position and disposed over the prearranged molding resin-impregnated strips shown in FIG. 2.
Figure 5:
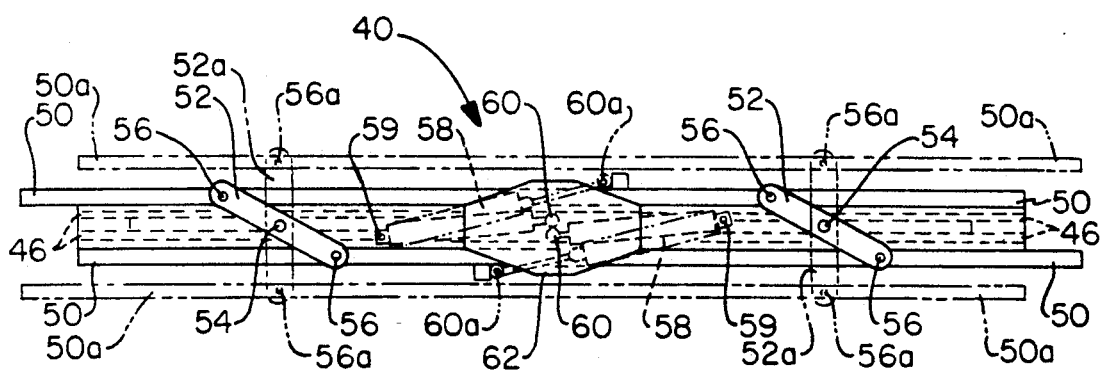
FIG. 5 is a top plan view of the central driver unit of the gripper apparatus in FIG. 4 with other parts removed.

Referring now to FIG. 3, the resin-impregnated sheets 32, 34, 36, 36a, and 38, are arranged in essentially the same lay-out pattern orientation as shown in FIG. 2 for placement in the die cavity 17. The gripping apparatus 15 of the present invention is positioned over the lay-out arrangement of molding sheets 32, 34, 36, 36a, and 38, to particularly grip and move the laterally spaced sheets as a unit for placement in the die cavity 17. The sheets are typically supported on a generally curved surface to match the mold contour surface comprising a lay-out station proximate to the molding die cavity 17.

The apparatus 15 comprises a central drive means unit 40 operatively interconnected to a plurality of outstretched wing units 42 where each wing unit 42 contains one or more operatively attached depending gripping talon units 44. The wing units 42 can be attached to the central drive means 40 at randomly selected points on either linear side of the drive means unit 40. Each wing unit 42 can be individually oriented in a lateral direction with the central drive unit 40, typically perpendicular, but can be angled as shown in FIG. 3 to about 25° with the linearly directed drive means unit 40. The various units 40, 42, 44 can be easily dismantled and quickly rearranged in a different gripping pattern orientation to accommodate changing lay-out patterns. In all orientations of the various units 40, 42, 44, the central drive means unit 40 is operative to transmit reciprocating movement through each wing unit 42 to simultaneously operate the downwardly depending gripping talon units 44 in unison. In addition to the units 40, 42, 44 being operatively interconnected, gripping talon units 44 are mechanically supported by the wing units 42 which in turn are mechanically supported by the central drive means unit 40.

Referring now to FIGS. 4, 5, 6, and 7, the central drive unit 40 contains a supporting structure comprising an upper channel 46 and a lower channel 47 adapted to support reciprocating drive means comprising a pair of linearly directed parallel bars 50 operative to reciprocate outwardly and inwardly to position laterally adjacent the supporting structure channels 46,47. The inward closed position of each reciprocating bar is shown in solid lines and designated as 50, while the outward expanded position of the reciprocating bars is shown in broken lines and designated 50a, as best viewed in FIG. 5. The laterally reciprocating drive bars 50 are each actuated by a pneumatic means pivotally connected to the supporting structure 45 at a pivot point 59 and having an operative reciprocating piston pivotally connected to the drive bar 50 at pivot connection point 60 designated as 60a for the outward expanded position. The reciprocally operated drive bars 50 are linked together by pivotally movable connecting linkages 52 containing a central pivot pin connection 54 with the supporting structure 45, while the distal ends of the linkage 52 are pivotally interconnected with drive bars 50 by end pivots 56. Thus, the drive bars 50 are maintained in unison reciprocal movement upon actuation of the pneumatic means 58. As best viewed in FIG. 5, connecting linkages 52 are shown in solid lines in angular connection with drive bars 50 in the closed position, but shown in broken lines in the expanded position, and designated 52a where linkages 52a are positioned approximately perpendicular to expanded drive bars 50a. As best viewed in FIGS. 6 and 7, the drive means unit 40 contains an upper mounting flange plate 62 for mounting to a robot arm for movement to and from the die mold cavity 17.

Figure 12:
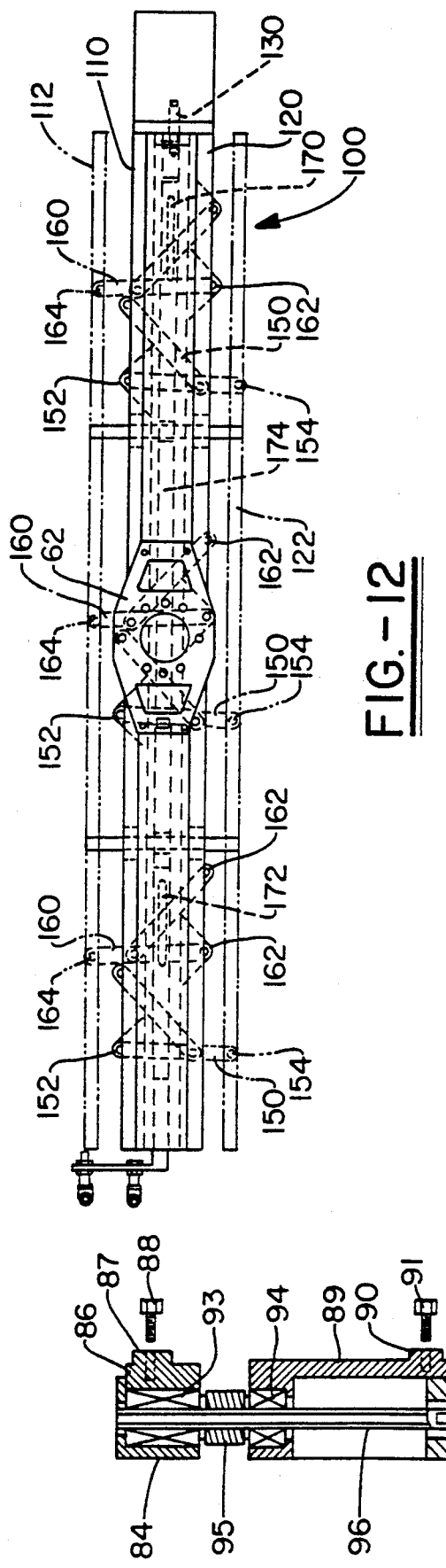
FIG. 12 is a top plan view of a preferred embodiment of the central drive unit with other units removed and similar to FIG. 5.
Figure 13:
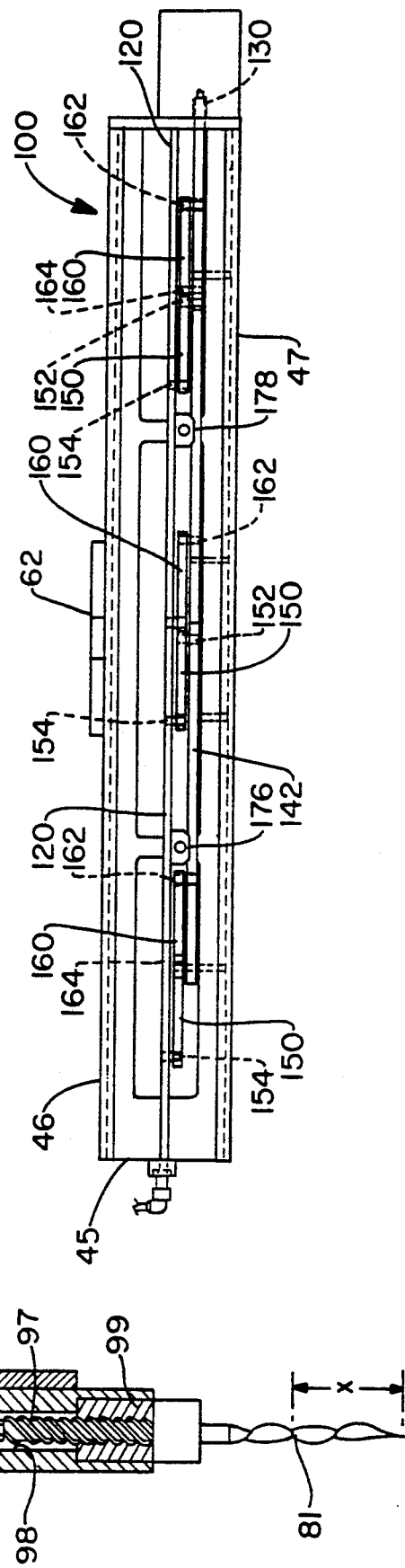
FIG. 13 is a front elevation view of the central drive unit shown in FIG. 12.

Referring now to FIGS. 12 and 13, shown is a preferred embodiment of the central drive unit 100 having a similar supporting structure 45 comprised of an upper channel 46 and a lower channel 47. The supporting structure 45 supports laterally spaced drive bars 110,120 operative to reciprocate laterally outwardly and inwardly relative to the support structure 45 in the manner described for the central drive unit shown in FIG. 5. In accordance with the preferred embodiment shown in FIGS. 12 and 13, the central drive unit 100 contains a single pneumatic drive means 130 located at one end of the support structure 45 and adapted to operatively reciprocate linearly in a longitudinal direction coinciding with the elongated dimension of the supporting structure 45. The pneumatic drive means 130 is operatively secured to a pair of laterally spaced side drive rails consisting of a right side drive rail 140 and a left side drive rail 142 as viewed from the pneumatic drive means 130 and in FIG. 12. The side drive rails 140,142 are operative to reciprocate linearly in a longitudinal direction in response to the linear reciprocating piston movement of the pneumatic drive means 130. The right side drive rail 140 is operatively interconnected to the left side drive bar 110 by connecting transverse linkages while the left side drive rail 142 is operatively interconnected to the right side drive bar 120 by connecting transverse linkages, whereby longitudinal reciprocative movement of the side rails 140,142 transversely translates into lateral reciprocating outward and inward movement of the respective side drive bars 110,120.

As viewed from the pneumatic means 130 and in FIG. 12, the right drive rail 140 is operatively interconnected to the left drive bar 120 by a plurality of pivotally connected linkages 150. Similarly, the left drive rail 142 is operatively interconnected to the right drive bar 110 by a plurality of pivotally connected linkages 160. Linkages 150 and 160 operate independently of each other, but in unison, to simultaneously actuate outward or inward lateral movement of the drive bars 110,120 in response to reciprocative movement of the pneumatic means 130. Linkages 150 are pivotally connected to the right drive rail 140 at pivot connections 152 and to the left drive bar 120 at pivot connections 154. Linkages 160 are pivotally connected to the left drive rail 142 at pivot connection 162 and at the right drive bar 110 at pivot connection 164. Pivot connections 152,154 and 162,164 preferably comprise a rotatable bushing or bearing means secured within the distal ends of each linkage 150,160 and are adapted to engage and rotate on a center bearing pin secured to the side drive rails 140,142 or to the drive bars 110,120, as the case may be.

As best viewed in FIG. 13, the left drive rail 142 is disposed below linkages 150,160 which in turn are interconnected to the left or right drive bars 110,120 disposed above the linkages 150,160. The pivot connections 152,162 of linkages 150,160 respectively with the side drive rails 140,142 are located on the lateral edges of the respective side rails 140,142. Accordingly, forward linear movement of the side drive rails 140,142 simultaneously actuates transverse lateral outward movement of the right and left drive bars 110,120 to the outward position 112 for the right drive bar 110 and to the outward position 122 for the left drive bar 120, as shown in broken lines in FIG. 12. Similarly, the interconnecting linkages 150,160 are shown in solid lines in the closed position for drive bars and in broken lines for open positions 112,122. The drive side rails 140,142 can be laterally spaced by one or more internal spacers 170,172,174 to maintain the side drive rails 140,142 laterally spaced during reciprocative linear movement thereof. Similarly, external guides 176,178 maintain external linear alignment of the side drive bars 110,120.

Figure 8:
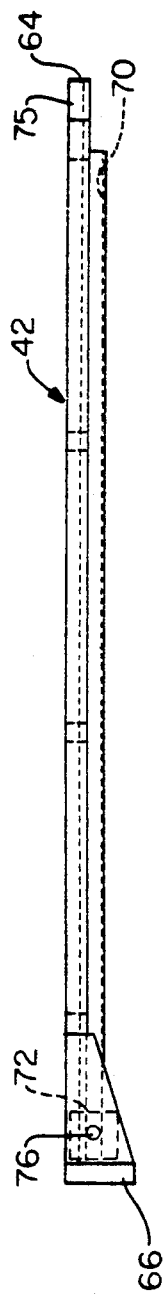
FIG. 8 is a top plan view of the wing unit of the gripper apparatus shown in FIG. 4 with other units removed.
Figure 9:
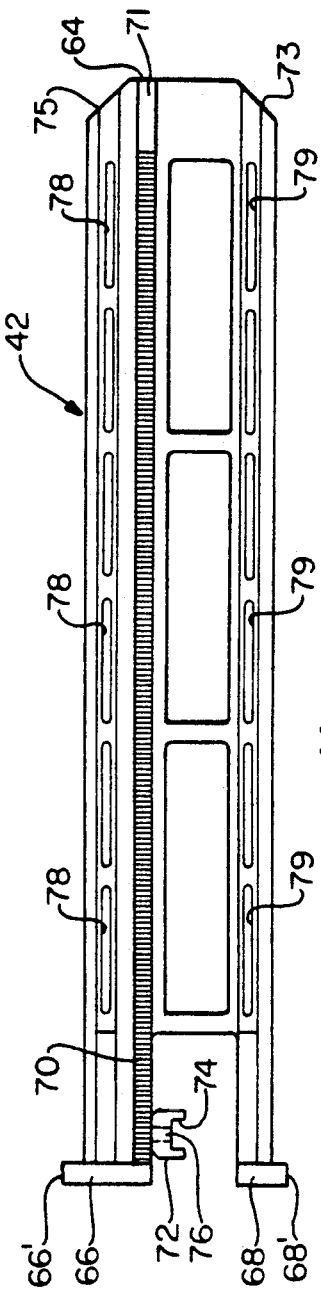
FIG. 9 is a front elevation view of the wing unit shown in FIG. 8.

Referring now to FIGS. 8 and 9, shown is the wing unit 42 removed and isolated from the central drive means 40. The wing unit 42 comprises a lateral frame structure 64 having one distal end adapted for interconnection with the drive means unit 40. In this regard, the mechanical interconnecting means on the wing frame structure 64 comprises an upper mounting flange plate 66 and a lower mounting flange plate 68. The upper flange 66 contains an upwardly extending extension 66' and a lower downwardly depending extension 68' where extensions 66' and 68' are adapted for sliding engagement with upper and lower U-shaped channels 46 and 47, respectively, and clamped into position with a locking screw (not shown) on the central drive means supporting structure 45. Hence, wing unit 42 can be quickly connected to the drive means support structure 45, or easily disconnected, as through the use of nuts and bolts, not shown. Since channels 46 and 47 are continuous linear channels, wing units 42 can be mechanically attached to the drive means supporting structure 45 at any random point chosen along the linear dimensions of channels 46,47, and on either lateral side of the drive means support structure 45.

In accordance with the present invention, each wing unit 42 contains a transmission means comprising a slidable rack gear 70 adapted to slide laterally within a slide channel 71 disposed in the upper part of the wing frame structure 64. The rack gear 70 is operative to reciprocate in the elongated direction of the wing unit 42 and laterally relative to the central drive means 40. In this regard, downwardly depending drive block 72 having a yoke 74 is attached to the slidable rack 70 at the connecting flange 66 end of the wing unit 42. The yoke 74 of the downwardly depending drive block 72 engages one of the reciprocating drive bars 50, or bars 110,120 of FIG. 12. The drive block 72 is secured to the sliding rack gear 70 by a locking pin 76 which passes through the drive block 72 and the sliding rack gear 70. The yoke 74 of the drive block 72 can be adjusted to accommodate the angle of attachment of the wing unit 42 to the drive means support structure 45. The wing unit 42 ordinarily is connected at a right angle to the drive means support structure 45, but can be angled otherwise by a locking hinge interconnection between the flange members 66,68 and the wing frame structure 64. The wing frame structure 64 is adapted to support one or more gripping talon units 44 by interconnection of talon units 44 within a series of elongated narrow upper slots 78 corresponding with a series of elongated narrow lower slots 79 disposed in the wing frame structure 64.

Figure 4:
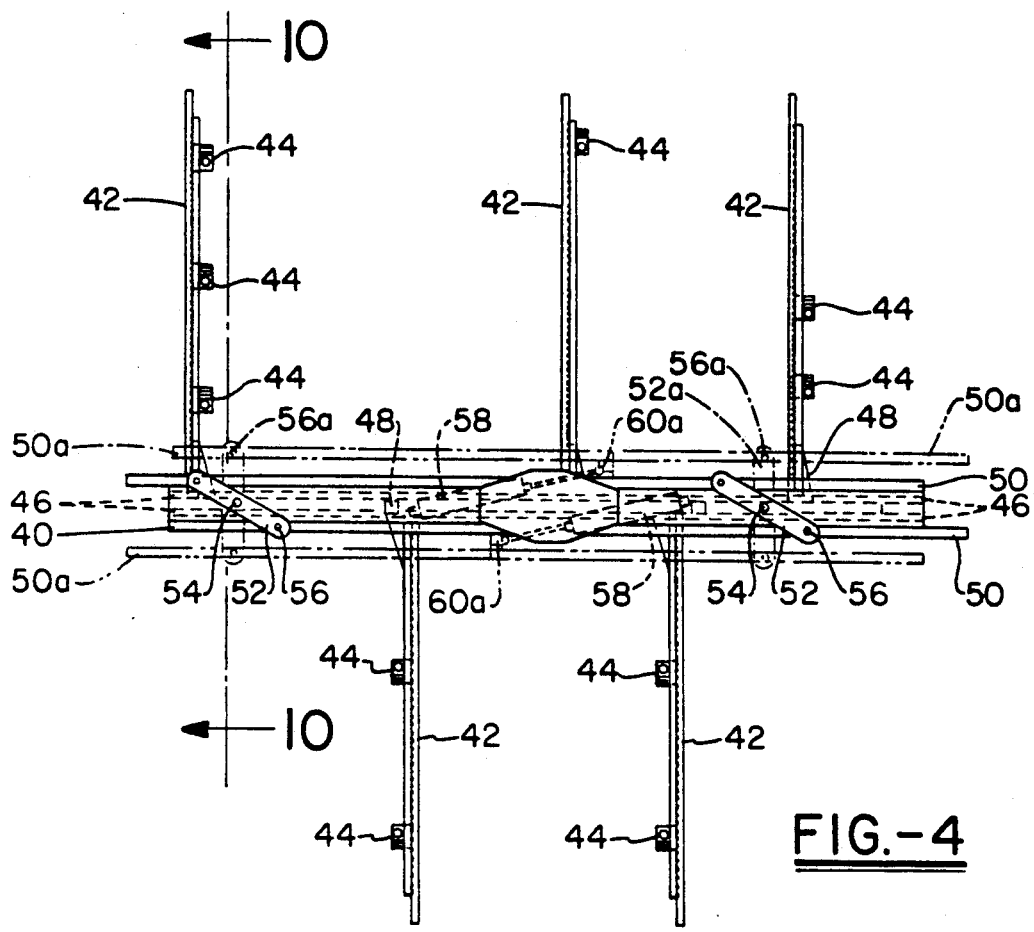
FIG. 4 is a top plan view of the gripper apparatus of FIG. 3, with assembled units differently arranged and adapted to pick up a different lay-out pattern.
Figure 6:
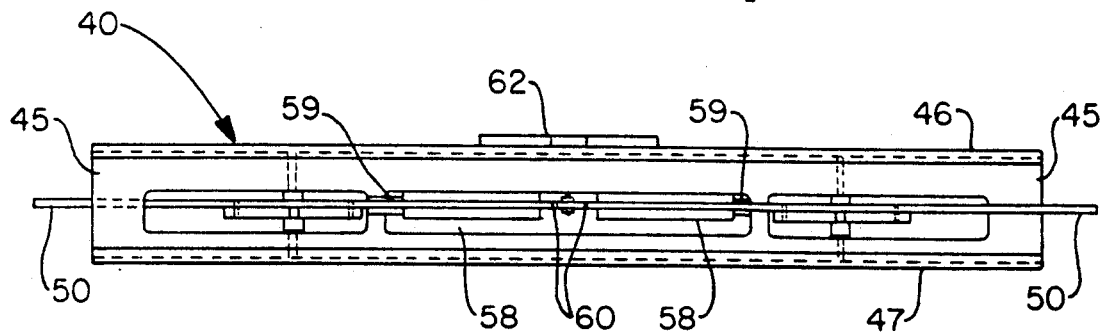
FIG. 6 is a front elevation view of the central driver unit shown in FIG. 5.
Figure 7:
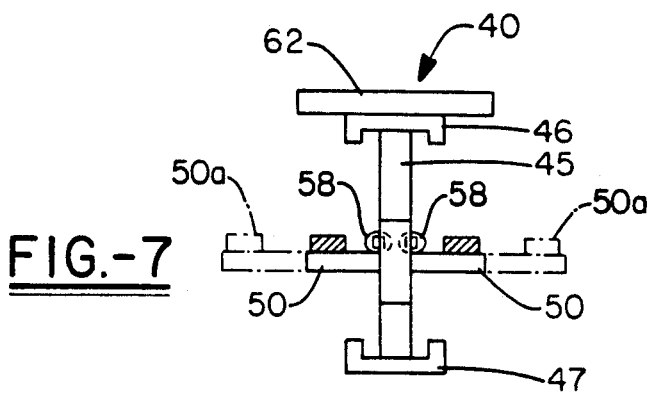
FIG. 7 is a side elevation end view of the central driver unit shown in FIGS. 5 and 6.
Figure 10:
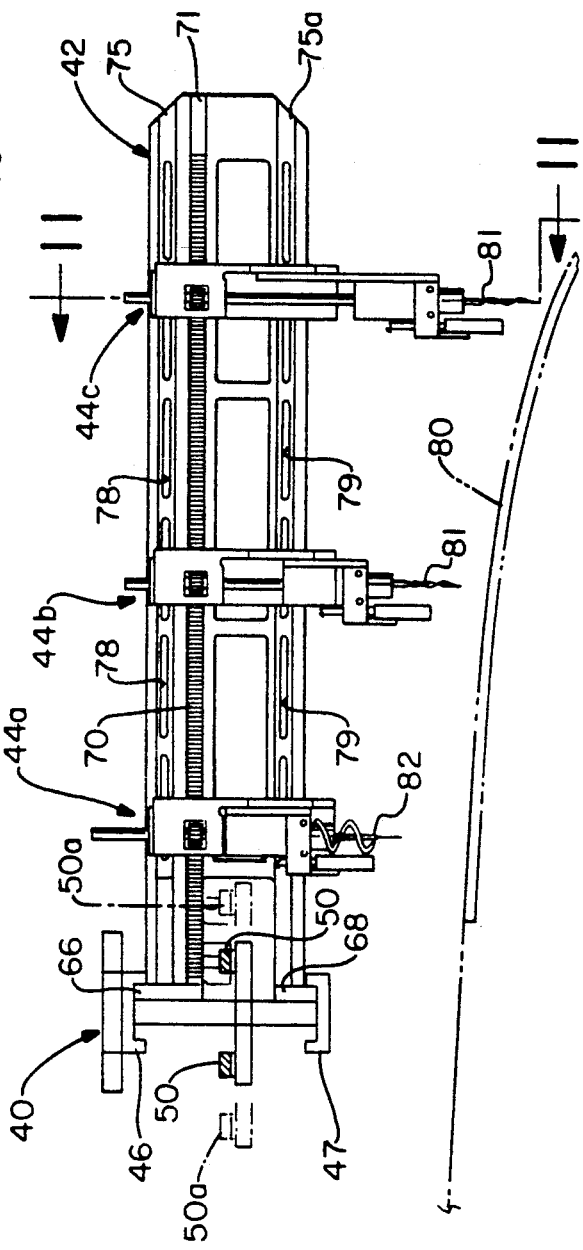
FIG. 10 is a side elevation sectional view of the gripping apparatus taken along lines 10—10 in FIG. 4.

Referring now to FIG. 10, shown is a sectional elevation view taken along lines 10—0 in FIG. 4 of the assembled gripper apparatus 15 comprising the wing unit 42 operatively attached to the central drive unit 40 and further supporting three operatively attached gripping talon units 44 laterally spaced from the central drive unit 40. The central drive unit 40 is shown in cross-section similar to FIG. 7 where upper and lower U-shaped channels 46,47 of the drive means support structure 45 interlock with mounting flanges 66,68 of the wing unit 42. A drive bar 50 on the central drive unit 40 securely engages drive block 72 secured to the slidable gear rack 70 to activate reciprocal movement of the sliding gear rack 70 operatively supported within lateral channel 71 of the wing unit 42. The wing unit 42 supports three downwardly depending gripping talon units 44a, 44b, and 44c, where the respective units 44a, 44b, 44c, are shown to extend downwardly to progressively increasing depths viewed left to right to accommodate the descending curvature of a prearranged lay-out pattern 80. The three gripping talon units 44a, 44b, 44c are adapted to simultaneously grip the curved lay-out pattern 80 at the same time, but at different depths consistent with the lay-out curvature. The gripper talon unit 44a, 44b, 44c can be attached anywhere within an elongated slot and to any three of the six corresponding pairs of slots 78,79, but are shown interconnected with the first, third, and fifth pairs of slots 78,79. Upon activation of the reciprocating drive bar 50, the slidable rack 70 reciprocates laterally which in turn actuates axial rotational movement of the downwardly depending gripping talon units 44a, 44b, 44c.

The gripping talons depending downwardly from the gripping talon units 44a, 44b, 44c shown in FIG. 10 are mismatched merely to show alternative embodiments of gripping talons, but ordinarily are matched in design in actual practice. Each depending gripping talon is a helically formed, downwardly depending, spiralled needle having a central rotational axis and comprising a helically formed corkscrew 81 shown depending from talon units 44b and 44c or comprising a helically formed spiral coil needle 82 shown depending from talon unit 44a. The much preferred gripping talon comprises the corkscrew needle 81 and the preferred talon unit 44 contains a plurality of talon units 44 each having a depending corkscrew needle 81 adjusted to the same or different depths to grip a flat or curved lay-out pattern 80.

Figure 11:
FIG. 11 is a sectional elevation view taken along lines 11—11 in FIG. 10.

FIG. 11 is an enlarged vertical section view of the gripping talon unit 44c taken along lines 11—11 in FIG. 10. Each gripper talon unit 44 comprises an outer housing 84 containing operative internal parts as well as external attachment for mechanically securing the gripper talon unit 44 to the wing unit 42. External attachment means comprise an upper holding plate 86 with a block extension 87 adapted to be fitted within an upper narrow channel 75 in wing frame structure 64 and locked in place by a tightening screw 88 extending through upper elongated slot 78 and securing extension 87. Similarly, a lower holding plate 89 containing a block extension 90 fits within lower lateral channel 73 in wing frame structure 64 and likewise is locked to structure 64 by a locking screw 91 adapted to engage extension 90 through lower slot 79 in the wing frame structure 64.

Each gripper talon unit 44 contains internal bearing means comprising an upper bearing 93 and a lower bearing 94 to permit axial rotation of the internal parts relative to the stationary housing 84 secured to the wing frame structure 64. Located between the upper and lower bearings 93,94 is a fixed-position pinion gear 95 operative to engage the sliding gear rack 70 on the wing unit 42. The pinion gear 95 contains an axial bore housing a polygonal cross-section adapted to engage and rotate axially a polygonal drive shaft 96 where the polygonal cross-sections of the bearing bore and the drive shaft preferably match. For instance, a hexagonal bore matching a hexagonal drive shaft 96 will operate to rotate the drive shaft axially, but simultaneously permit vertical movement of the drive shaft within the hexagonal bore. Similarly, the bearings 93,94 contain polygonal bores which likewise permit free axial movement of the polygonal drive shaft 96 within the bearing bores while the bearings 93,94 are operative to rotate with the drive shaft 96. The lower position of the axial drive shaft 96 is secured to a helical screw means 97 partially disposed within an oversize internal axial opening 98 to permit free rotation within the housing 84, while the lower end of the helical screw 97 engages an internally threaded, helical thread fixed nut 99. Operative rotation of the pinion gear 95 actuates axial rotation of the drive shaft 96 and the attached helical screw 97 which causes the helical screw 97 to simultaneously translate vertically downwardly or upwardly through the fixed helical nut 99 depending on rotation or counter-rotation of the pinion gear 95.

The helical screw 97 is interconnected to a gripping talon assembly comprising an axially aligned, downwardly directed corkscrew needle 81 adapted to penetrate the prearranged lay-out sheets or pattern through a single insertion point. The corkscrew design of the gripping talon 81 in conjunction with the simultaneous rotation and downward movement of the gripping talon 81 avoids drilling a hole in the lay-out sheet or pattern and enables a narrow incision. The simultaneous rotation and axial movement enables succeeding threads of the corkscrew talon 81 to enter the same incision and thereby minimize damage to the molding sheet. To obtain proper corkscrew rotation, the corkscrew talon or needle 81 requires simultaneous axial rotary and downward movement of the needle 81 actuated by interconnection with the helical screw 97 rotating within the fixed helical nut 99. For optimal operation, the coil pitch "X" of the corkscrew needle 81 should be the same pitch as the internal threaded pitch of the helical screw 97. Rotation of the corkscrew threads further causes engagement of the lay-out sheets or pattern by impingement of the sheet between the first and second threads or between succeeding adjacent threads. Hence, the lay-out sheets or pattern can be lifted and transported to the molding die cavity 17 by friction engagement with the gripping corkscrew talon 81. To discharge the layout sheets or pattern onto the mold cavity 17, the procedure is reversed whereby the corkscrew talon 17 is counter-rotated while simultaneously axially raising the gripping corkscrew talon or needle 81 to withdraw the corkscrew needle 81 through the same incision in the lay-out sheets or pattern. The lay-out sheets or pattern are readily released from the corkscrew needle without the need for extraneous stripper means to strip the lay-out sheets or pattern from the talon 81.

In accordance with the present invention, the gripping apparatus can be quickly assembled and adapted to pick up various odd-shaped lay-outs, as desired. The central drive means 40 can be operatively interconnected with a compressed air source to operate the reciprocating pneumatic cylinders 58 attached to the central drive unit 40. A plurality of outstretched wing nuts 42 can be mechanically attached to the central drive unit 40 at locations desired. Operative interconnection between the central drive unit 40 is achieved by securing drive bar 50 to each drive block 72 attached to each rack gear 70 operatively supported by the respective wing units 42. Individual gripper talon units 44 can be located along each outstretched wing unit 42 and attached thereto as desired. The gripper talon units 44 can be operatively interconnected to sliding gear rack 70 of the respective wing units 42 by engaging pinion gear 95 with rack gear 70. The individual gripping talons can be adjusted to different heights as desired to accommodate contours in the molding lay-out or pattern. The gripping corkscrew talon or needle 81 is simultaneously activated in synchronized movement by interaction with the drive rack gear 70 and drive bars 50 in response to operating the reciprocating pneumatic air source. To attach the corkscrew needle 81 to a prearranged lay-out or pattern, the parallel drive bars are laterally expanded to a position 50a which advances the rack gear 70 laterally along the wing unit 42 whereby the advancing rack gear 70 causes axial rotational movement of the meshing pinion gear 95 on each gripper talon unit 44. In response to axial rotation of the pinion gear 95, the plurality of corkscrew needles 81 rotate axially while simultaneously descending by translational movement of the helical screw 97 through the fixed helical nut 99 whereby each corkscrew needle 81 penetrates the lay-out or pattern at a single incision point. Corkscrew rotation of the needle 81 causes twisting engagement of the lay-out or pattern with adjacent threads on the corkscrew needle 81, whereby the lay-out or pattern can be lifted and transported to the mold cavity 17. After properly locating the lay-out or pattern within the mold cavity 17, the operational movements are reversed or reciprocated back to the original position by closing drive bars 50a to the closed position 50 laterally adjacent the central drive nut 40. The rack gear 70 reverses the rotation of the meshing pinion gear 95 which in turn counter-rotates the corkscrew needle 81 while simultaneously withdrawing the needle 81 through the incision openings in the lay-out or pattern. The cycle can be repeated to transport a second lay-out or pattern to the mold die cavity 17.

After the lay-out or pattern is molded into a plastic part by compression molding, a similar or identical material handling apparatus can be utilized to remove the molded part from the die cavity 17, except that the gripping talon units 44 can be replaced by L-shaped lifters (not shown) having downwardly depending arms terminating in a horizontally disposed lifting foot. The lifting foot rotates axially outward to descend and clear the mold, but then rotates 90° to 180° axially inward to engage and lift the molded part from the mold cavity 17.

The gripping apparatus 15 of this invention enables the process engineer to quickly make adjustments in response to changing molded parts where various sizes can be accommodated by adjusting the basic units 40,42,44 of the apparatus. Despite the multitude of lay-out and pattern configurations possible, all gripper talon units 44 are actuated by a single drive unit 40 whereby all gripper talon units are synchronized while engaging the lay-out or pattern or discharging the same into the mold cavity 17.

While in accordance with the Patent Statutes, the best mode and preferred embodiment has been set forth, the scope of the invention is not limited thereto, but rather by the scope of the attached claims.

What is claimed is:

1. A material handling apparatus for transporting a molding lay-out pattern, comprising:
   a central drive means including supporting structure, at least one wing unit supported by the central drive means supporting structure in a lateral outstretched orientation relative to the central drive means, each wing unit containing lateral transmission means operatively actuated by the central drive means to reciprocate in the elongated wing unit, and at least one gripping talon unit supported by the wing unit and operatively interconnected to said lateral transmission means, each said gripping talon unit operative to pick up and transport the lay-out pattern.

2. An apparatus according to claim 1, wherein said central drive means having at least one drive means operative to reciprocate laterally outwardly and inwardly relative to the central drive means, wherein said drive means operatively engages each lateral transmission, each lateral transmission means operatively engaging at least one of said gripping talon units.

3. An apparatus according to claim 2, wherein each said gripping talon unit comprising a depending corkscrew talon having a central rotational axis, actuating means engaging said lateral transmission means and operative to axially rotate said corkscrew talon, helical translation means interconnected to said rotational means and operative to axially reciprocate said corkscrew talon simultaneously while axially rotating the corkscrew talon, wherein said corkscrew talon is adapted to penetrate the lay-out pattern through a single incision in the lay-out pattern to grip the layout pattern for movement to the mold cavity, wherein the corkscrew talon is adapted to be reverse-rotated to release the gripping talon from gripping the lay-out pattern.

4. An apparatus according to claim 3, wherein the helical screw engages a fixed helical nut, and wherein the internal threads of the fixed helical nut have a pitch approximately equal to the pitch of the corkscrew talon, wherein said rotational actuating means comprises a pinion gear engaging said lateral transmission means to operate said corkscrew talon, and wherein the pinion gear is operatively interconnected to said helical translation means by an axial drive shaft.

5. An apparatus according to claim 3, wherein said gripping talon unit comprises an external housing having an internal central drive shaft operatively interconnected to the corkscrew talon, wherein said rotational actuating means comprises a pinion gear containing an internal polygonal cross-sectional bore, and said central drive shaft comprises a polygonal cross-sectional shaft adapted to fit within said polygonal bore of the pinion gear to permit free axial movement of the drive shaft within the pinion gear while the pinion gear rotates the drive shaft axially.

6. An apparatus according to claim 5, wherein the polygonal cross-section of the central drive shaft matches the polygonal cross-sectional of the pinion gear bore, wherein said housing contains internal bearing means disposed between the external housing and internal central drive shaft to permit rotational movement of the bearing and central shaft relative to the housing, and wherein the bearing means contains a polygonal bore matching the polygonal cross-section of the central drive shaft to permit free axial reciprocating movement within the bearing means while said bearing means rotates axially with said central drive shaft.

7. An apparatus according to claim 3, wherein the lateral transmission means on each wing unit comprises a sliding rack adapted to reciprocate and slide laterally on the wing unit, wherein each wing unit contains a plurality of supporting means for supporting each said gripping talon unit, wherein said supporting means comprises elongated slots for variable lateral adjusting attachment of each gripping talon unit to the wing nut.

8. An apparatus according to claim 3, wherein at least one of the wing units is attached to the central drive means supporting structure at an angle approximately perpendicular to the supporting structure.

9. An apparatus according to claim 3, wherein at least one of the wing units is attached to the central drive means supporting structure in a non-perpendicular angle with the supporting structure of from about 65° to about 115°, and wherein the reciprocating drive means comprises at least one drive bar adapted to operatively reciprocate a plurality of lateral transmission means on two or more wing units operatively connected to the reciprocating drive means.

10. An apparatus according to claim 9, wherein the reciprocating drive means comprises two linearly directed parallel drive bars, the first drive bar on one side of the central drive means and the second drive bar on the opposed side of the central drive means, wherein said drive bars are adapted to simultaneously reciprocate laterally outwardly and inwardly in unison relative to the central drive means, where the linear direction transverses the lateral direction, wherein the central drive means supporting structure supports one or more cross-linkages having one distal end pivotally mounted to the first drive bar and the other distal end pivotally mounted to the second drive bar, said cross-linkages having a mid-point pivotal connection to the supporting structure and adapted to reciprocate the first drive bar and the second drive bar in unison.

11. An apparatus according to claim 8, wherein pneumatic air means is pivotally connected to said central drive means supporting structure, wherein said pneumatic air means is operatively connected to said drive bar to reciprocate said drive bar outwardly from the central drive structure, and wherein the central drive means contains two drive bars and each drive bar is actuated by a separate pneumatic air means.

12. An apparatus according to claim 3, containing two or more wing units wherein each wing unit supports one or more gripper talons, wherein the central drive means supporting structure includes channel means for random placement and support connection of two or more wing units, wherein each said wing unit contains pendant flange means for locking interconnection and support of the wing unit with the central drive means, and wherein the talon is a helically formed spiral coil needle.

13. The apparatus according to claim 9, wherein each said reciprocating drive bear is operatively interconnected with a linearly reciprocating drive rail where linear movement of the drive rail actuates lateral movement of the drive bar.

14. The apparatus of claim 10, wherein each linear drive bar is operatively interconnected by at least one transverse linkage to a drive rail operative to reciprocate linearly where linear movement of the drive rail is operative to actuate transverse lateral movement of the drive bar, wherein the linear drive bars comprise a left drive bar and a right drive bar, said drive rails comprise a left drive rail and a right drive rail, where said left drive bar is operatively interconnected to the right drive rail and said right drive bar is operatively interconnected to said left drive rail.

15. A material handling apparatus for transporting a molding lay-out pattern, the apparatus containing at least one gripping talon adapted to pick-up, transport, and discharge the lay-out pattern, the gripping talon comprising:

a downwardly depending, helically formed spiralled talon having a central rotational axis, said talon being operative to axially rotate and simultaneously axially reciprocate where axial downward movement is operative to engage the lay-out pattern through a single incision point in the lay-out pattern and axial upward movement is operative to discharge the lay-out pattern from the gripping talon.

16. The apparatus of claim 15, wherein the helically formed spiral talon comprises a helically formed corkscrew.

17. The apparatus of claim 15 having actuating means operatively engaging the gripping talon to simultaneously rotate and axially move the gripping talon, wherein the actuating means is operative to axially reciprocate the gripping talon in a vertically downward and upward movement, wherein axial reciprocation of the gripping talon is operative to rotate and pick-up the lay-out pattern on the downward movement of the gripping talon and operative to reverse rotate and discharge the lay-out pattern on the upward movement of the gripping talon.

18. The apparatus of claim 15, wherein the actuating means of the apparatus actuates helical translation means interconnected with axial rotational means to operatively axially reciprocate said gripping talon while simultaneously axially rotating the gripping talon, wherein the translation means is contained within a unit supporting the griping talon and comprises a helical screw engaging internal threads of helical nut to translate helical, rotational, and axial reciprocating movement of the gripping talon, and wherein the gripping talon comprises a corkscrew having a coil pitch, and wherein the fixed helical nut has internal threads having a pitch approximately equal to the coil pitch of the corkscrew talon.

19. The apparatus of claim 15, wherein the actuating means of the apparatus comprises an operative reciprocating means adapted to axially rotate and simultaneously axially reciprocate the gripping talon, and wherein the operative reciprocating means comprises a pneumatic means.

20. The apparatus of claim 18, wherein the rotational means comprises a pinion gear containing an internal polygonal cross-sectional bore containing a polygonal central drive shaft adapted to fit within said polygonal bore and engage the pinion gear to permit free axial movement of the drive shaft within the pinion gear while said pinion gear rotates the drive shaft axially, said drive shaft operatively connected to said gripping talon, wherein the polygonal cross-section of the central drive shaft matches the polygonal cross-section of the pinion gear bore.

* * * * *